INVENTOR
ERNEST S. ULM

INVENTOR.
ERNEST S. ULM

BY

Oberlin, Maky, Donnelly & Renner
ATTORNEYS 3,605,182
LOCK MEANS FOR POST-CURE INFLATOR
Ernest S. Ulm, Stow, Ohio, assignor to
NRM Corporation, Akron, Ohio
Filed Aug. 25, 1969, Ser. No. 852,849
Int. Cl. B29h 5/02
U.S. Cl. 18—2TP                               9 Claims

ABSTRACT OF THE DISCLOSURE

A post cure inflator lock embodying an air inlet valve which is automatically opened to admit air into a tire held between bead engaging members only when a lock plunger is moved by inlet pressure to a position effecting locking together of the bead engaging members against separation. The lock herein is also arranged so that when the inlet passage is vented, the tire deflates through the inlet valve to nearly ambient pressure before the lock plunger is permitted to move to unlocking position whereat the inlet valve is closed and another vent passage is opened.

BACKGROUND OF THE INVENTION

In connection with the curing of tires it has been found desirable after discharging a hot tire from a tire curing press, to transport the tire to a post cure inflator whereat the tire beads are engaged with bead engaging members and the tire is inflated with higher than normal inflation pressure to effect cooling of the tire while under pressure. This has been found to continue the curing cycle, thus shortening the cycle time of the tire curing press, and in the case of certain cord materials such as nylon, the cooling of the tire while inflated prevents cord shrinkage.

In one known form of post cure inflator as, for example, disclosed in the patent to James W. Brundage, No. 3,241,180, granted Mar. 22, 1966, the tire bead engaging members have interfitting plug and socket portions equipped with bayonet type lock means necessitating part turn rotation of the plug portion after it is inserted into the socket portion. Thereafter, air pressure for inflating the tire is admitted through an inlet port provided in the socket portion. In another known form of post cure inflator, an air pressure actuated locking member in one bead engaging member swings the pivoted lockings dogs thereof to a position to engage an inturned shoulder in the socket portion of the other bead engaging and establishes communication with an air pressure supply passage. However, this latter type of post cure inflator requires two pressure lines, one to actuate the lock member, and the other to inflate the tire.

SUMMARY OF THE INVENTION

Contrary to the foregoing known types of post cure inflators, the present invention embodies a pressure supply passage which not only conducts air for actuating a lock plunger to locking position but also conducts air into the space between the bead engaging members for inflating the tire. Furthermore, the lock plunger is operative to close a vent passage in one of the bead engaging members when it is pressure actuated to locking position.

Another object of this invention is to provide a lock means for the bead engaging members of a post cure inflator in which one bead engaging member has therein an inlet valve which blocks passage of air into the tire until the fluid pressure actuated lock plunger in said one bead engaging member is moved to locking position whereat it locks the bead engaging members against separation, and opens the inlet valve, and closes a vent passage so that the tire may be inflated by air pressure admitted through the open inlet valve.

It is another object of this invention to provide a lock means for a post cure inflator as aforesaid, in which the inlet valve which is opened by the fluid pressure actuated locking member remains open for deflating the tire until the tire pressure drops to nearly ambient pressure, and only at this time is the lock plunger permitted to return to unlocking position so that the bead engaging members may be separated and the cooled tire removed from therebetween ready for insertion of the next hot tire which is to be cooled while inflated.

Another object of this invention is to provide a lock means for a post cure inflator which is of simple construction and which enables rotation of the tire and bead engaging members about the axis of the tire while the tire is inflated thus to secure uniform cooling of the tire.

Other objects and advantages will appear from the ensuing description.

DETAILED DESCRIPTION OF THE INVENTION

Figure 1:
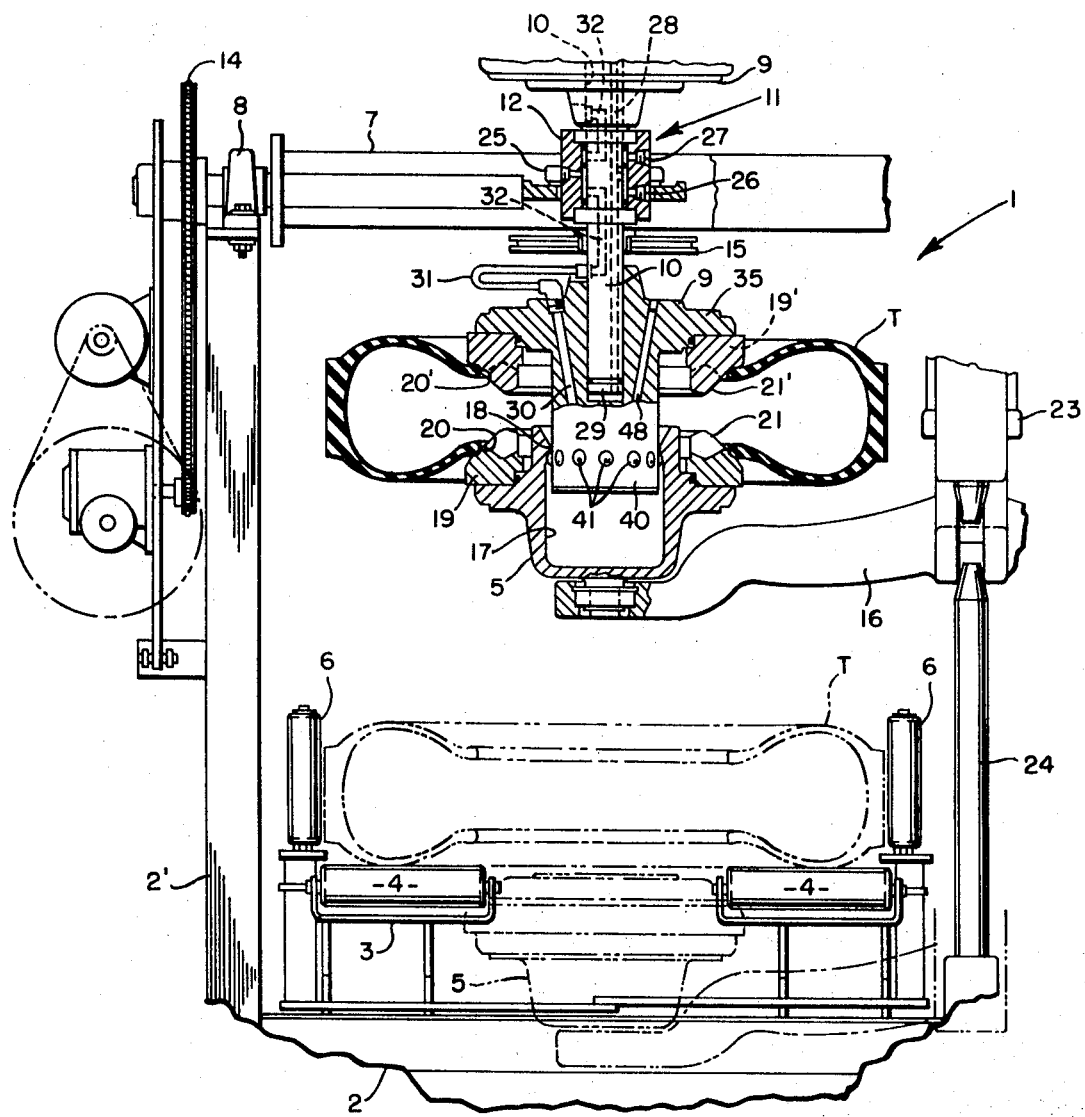
FIG. 1 is a central cross-section view of a preferred embodiment of this invention.

In the drawings, the post cure inflator 1 preferably comprises duplicate side by side post cure inflators on a single frame or base 2 to service a duel tire curing press having side by side molds. Accordingly, in the drawings herein only the left half of the post cure inflator 1 has been shown and it is to be understood that the right half is a substantial duplicate of the left half. As shown in FIG. 1, the post cure inflator 1 comprises a base 2 on which is supported a conveyor 3 which is adapted to be positioned at the rear of the tire curing press (not shown) with the rollers 4 disposed on an inclined plane so that a tire T discharged from the press will slide down the conveyor 3 to a stop position whereat the tire T will be centered above the bottom bead engaging member 5 when the latter is in the dot-dash line position (FIG. 1) after a cooled tire T has been discharged from the other end of the conveyor 3. The conveyor may be provided with generally vertical rolls 6 which are engaged by the tire tread to assist in centering of the tire with respect to the bottom bead engaging member 5.

At opposite sides of the base 2 there are provided upstanding frame members 2' having a horizontal frame member 7 journalled on bearings 8 for rotary indexing movement. Said frame member 7 mounts opposite upper bead engaging members 9 which are slidably keyed on the shaft portions 10 of the swivel coupling assembly 11. The swivel body 12 is fixedly secured to the frame member 7. The frame member 7 may be rotatably indexed as by the chain drive mechanism 14 so that when a tire is inflated as in FIG. 1, it may be indexed to a vertical position and rotated as by the pulley 15 on shaft portion 10 to effect uniform cooling.

The bottom bead engaging member 5 is journalled in a yoke 16 and is provided with a socket 17 terminating adjacent its upper end in an inturned locking shoulder 18. The bottom bead engaging member 5 also has mounted thereon a bead engaging ring 19 which provides a seat 20 for the bottom bead of the tire T and which has upwardly extending teeth 21 having inwardly and upwardly inclined outer surfaces which serve to guide the bottom bead of the tire T to its seated position on seat 20.

When a tire T has been cooled while inflated, the tire is deflated and when the yoke 16 is lowered by cylinder 23 along the guide 24, the downward movement of the cooled tire T will be intercepted by the conveyor rolls 4 whereby the cooled tire T will be discharged from the lower end of the conveyor 3 and the next hot tire T from the press may move along the conveyor 3 to a centered position above the bottom bead engaging member 5.

The swivel body 12 aforesaid has three ports 25, 26, and 27 for admission of air under pressure, one of them (port 25) communicating with a passage 28 extending through the shaft portions 10 whereby the spaces 29 between the ends of the shaft portions 10 and the recesses in the bead engaging members 9 constitute air springs for a purpose which is hereinafter explained in detail, and the other two ports (ports 26 and 27) communicating with the inlet passages 30 via flexible hoses 31 and shaft passages 32.

Figure 2:
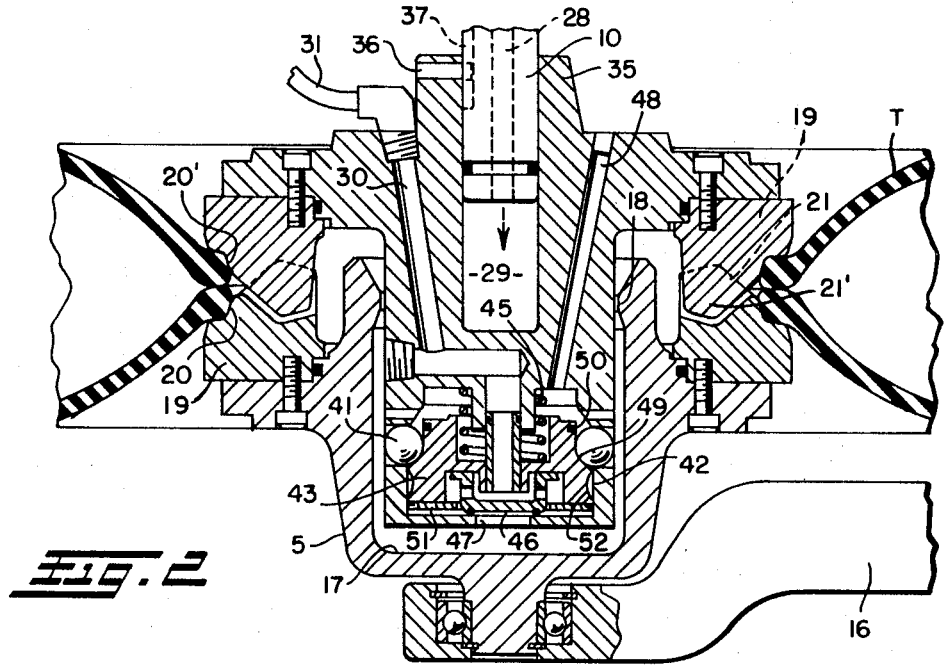
FIG. 2 is a fragmentary cross-section view showing how a hot tire is initially seated on the seats of the bead engaging members prior to admission of inflation air.
Figure 3:
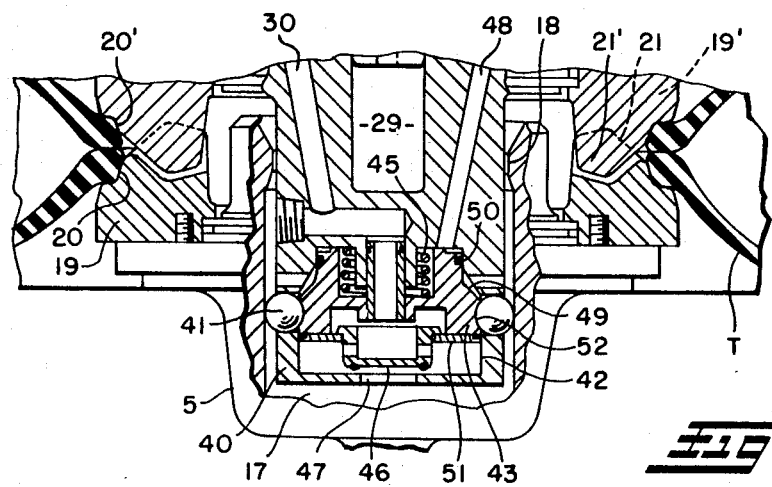
FIG. 3 is a cross-section view similar to FIG. 2 except that air under pressure has been admitted into one bead engaging member to shift the lock plunger to bead engaging member inlet valve opening position.
Figure 4:
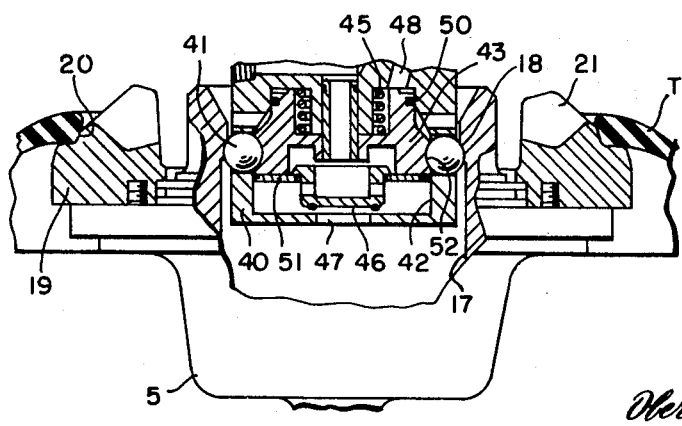
FIG. 4 is a cross-section view similar to FIGS. 2 and 3 except illustrating the inflated position of the tire which is seated on the opposed and now spaced apart, but locked, bead engaging members.

Referring to FIGS. 2 to 4, the body 35 of the upper bead engaging member 9 has thereon a key 36 which extends into an axial keyway 37 in the shaft portion 10 whereby the shaft 10 and body 35 are rotated in unison but are relatively axially movable between the FIG. 2 position and the FIG. 1 (and 4) position. The upper bead engaging member 9 also has a bead ring member 19' which provides a seat 20' to engage the upper bead of the tire T and has downwardly depending teeth 21' also having inwardly and downwardly sloped outer sides to guide the upper bead to seated position as the bead engaging members 9 and 5 are moved relatively toward each other. The teeth 21 and 21' of the respective rings 19 and 19' are circumferentially offset so that the teeth may interfit each other as shown in FIGS. 2 and 3 so as to be able to force the upper and lower beads of the tire T to firm sealing engagement with the respective seats 20 and 20'.

The upper bead engaging member 9 has a downwardly extending plug portion 40 which is adapted to extend into the socket portion 17 of the bottom bead engaging member 5. The plug portion 40 has a plurality of radial openings therethrough in which are disposed radially movable locking members such as the balls 41. The interior of the plug portion 40 is in the form of an annular cylinder 42 in which the annular fluid pressure actuated lock plunger 43 is reciprocable, said plunger 43 being urged to the unlocking position as shown in FIG. 2 as by means of the spring 45. In the unlocking position, the plunger 43 bears on an inlet valve member 46 which is seated around the opening 47 in the lower end of the plug portion 40. The plug portion 40 is provided with a pressure inlet passage 30 and with a vent passage 48 which is opened by the plunger 40 as shown in FIG. 2 when the balls 41 are in unlocking position and, thus, when the yoke 16 and bottom bead engaging member 5 are moved upwardly, the tire beads may be pressed toward each other and seated on the respective seats 20 and 20' and air displaced from between the tire beads is exhausted through said vent passage 48.

Insofar as operation is concerned, when the bottom bead engaging member 5 is in the dot-dash line position shown in FIG. 1, and when a hot tire T discharged from the press is centered above the bottom bead engaging member 5, the latter may be moved upwardly as by the piston cylinder assembly 23. Initially the bottom bead engaging member 5 will engage the bottom bead of the tire T and lift it until the top bead of the tire engages the upper bead engaging member 9, and as the upward movement of the bottom bead engaging member 5 continues, the tire beads are moved toward each other to the position shown in FIG. 2. Up to this point, air pressure in the chamber 29 and the weight of the upper bead engaging member 9 resists upward movement of the bead engaging member 9 and, of course, as the tire beads move toward each other the air therebetween is exhausted through the vent passage 48.

Now, when air under pressure is admitted through the port 26 of the swivel body 12 and through the passage 32 and flexible hose 31 to the inlet passage 30 the first thing that occurs is that pressure builds up beneath the lock plunger 43 whereby when the pressure overcomes the spring 45 force, the plunger 43 will start to move upwardly whereby the cam surface 49 thereof will urge the balls 41 radially outwardly to the position shown in FIG. 3. At the same time, the O-ring 50 will close off the vent passage 48. It can be seen from FIG. 2 that as the bottom bead engaging member was moved upwardly as aforesaid, to the FIG. 2 position, the plug portion 40 of the upper bead engaging member 9 had entered the socket portion 17 of the bottom bead engaging member 5 with the balls 41 disposed in spaced relation below the inturned locking shoulder 18.

At the time that the plunger 43 approaches the FIG. 3 position, a plate 51 on the lower end thereof engages the inlet valve member 46 to lift it from its seat whereby air pressure in the inlet passage 30 is permitted to flow through the opening 47 into the socket portion 17 and past the balls 41 into the space between the bead engaging members 5 and 9 and into the tire T. As the pressure between the seat engaging members 5 and 9 and within the tire T increases, it overcomes the force of the air spring 29 whereby the tire T is supported in its normal inflated shape as shown in FIG. 1, with the beads spaced apart the standard bead-to-bead distance.

With the tire T thus inflated, as shown in FIGS. 1 and 4, and with the balls 41 engaged with the inturned shoulder 18 to prevent separation of the bead engaging members 5 and 9, the frame member 7 may be turned by the chain drive mechanism 14 to index the tire T to vertical position, and power drive means (not shown) will be energized to rotate the bead engaging members 5 and 9 and the tire T as through the pulley 15 to effect cooling of the tire while rotating and while inflated.

The other shaft portion 10 has another bead engaging assembly 9 thereon and since the tire T thereon will already have been cooled for one press cycle it will be ready to be discharged at the end of the next press cycle. It can be seen that when the port 26 in the swivel body 12 is vented, pressure in the tire will open the inlet valve 46 to permit escape of air from within the tire T and from between the bead engaging members 5 and 9 until the air spring 29 and weight of the bead engaging member 9 is sufficient to move the upper bead engaging member 9 downwardly a small distance to disengage the balls 41 from the inturned shoulder 18 so that the balls 41 may move outwardly from the shallow groove 52 as the plunger spring 45 begins to move the lock plunger 43 downwardly. As the O-ring 50 comes opposite the tapered portion further escape of air will occur through the vent passage 48, whereby venting occurs rapidly through both the inlet passage 30 and the vent passage 48. Finally, the plunger 43 will reach its lowermost position whereat the vent passage 48 is wide open and the inlet valve 46 is closed. In view of the large projected area of the tire and bead engaging member 9 relative to the area of the air spring 29, the pressure in the tire T will decrease to nearly ambient pressure before the bead engaging member 9 will move down to release the lock plunger 43 for downward movement.

Now, when the bottom bead engaging member 5 is moved downwardly, the socket portion 17 is withdrawn from the plug portion 40 and the tire T moves downwardly therewith. The downward movement of the tire T is arrested by the conveyor 3 whereby continued downward movement of the bottom bead engaging member 5 strips the seat 20 from the bottom bead so that the cooled tire T is ready to be discharged, and the next hot tire may be received from the tire curing press for repetition of the foregoing operations.

I, therefore, particularly point out and distinctly claim as my invention:

1. Lock means for a post cure inflator of the type wherein tire support members having plug and socket portions and tire bead engaging seats are movable toward each other to position said portions in axially interfitting relation and to engage said seats with the beads of a tire which is to be inflated; said lock means comprising locking members radially movable in said plug portion to engage and disengage a radially inturned shoulder of said socket portion respectively to lock said support members against axial separation so that a tire having its beads engaged with said seats may be inflated and to unlock said support members for axial separation thereof so that a tire therebetween may be removed and another one inserted therebetween; an actuator movable in said plug portion to unlocking position to permit radial inward movement of said locking members out of engagement with said shoulder and to locking position to move said locking members radially outward for engagement with said shoulder when the tire is inflated; said plug portion having a passage through which air under pressure may be admitted between said support members into a tire to be inflated; a valve member movable in said plug portion to open and close said passage; means supplying air under pressure to said passage upstream of said actuator and said valve member to move said actuator to locking position for engagement of said actuator with said valve member to open said passage whereby a tire having its beads engaged with said seats may be inflated only when said support members are locked against axial separation.

2. The lock means of claim 1 wherein spring means biases said actuator to unlocking position upon venting of said passage.

3. The lock means of claim 1 wherein said locking members comprise balls; said actuator having a cam surface to move said balls radially outward for engagement with said shoulder.

4. The lock means of claim 1 wherein said plug portion has a vent passage leading to the space between said support members; and wherein said actuator closes said vent passage upon movement to locking position for inflation of the tire through the passage opened by said valve member.

5. The lock means of claim 4 wherein said actuator comprises a piston having one side exposed to air pressure in said passage upstream of said valve member.

6. The lock means of claim 5 wherein the other side of said piston is exposed to the atmosphere via said vent passage.

7. The lock means of claim 1 wherein said locking members are held by said shoulder in locking engagement with said actuator whereby the latter cannot be moved to unlocking position while the tire is inflated; and wherein spring means acting on one support member is operative, upon deflation of the tire to nearly atmospheric pressure, to move said one support member toward the other thus to axially separate said shoulder and said locking members to release the latter from locking engagement with said actuator.

8. The lock means of claim 7 wherein said locking members are balls having radially outer portions engageable with said shoulder and radially inner portions engageable in a peripheral groove in said actuator when the latter is in locking position; and wherein said shoulder is beveled to hold said balls in engagement with said groove while the tire is inflated, said balls being released for radial outward movement out of engagement with said groove when said spring means is effective to axially separate said beveled shoulder and balls.

9. The lock means of claim 8 wherein said actuator, adjacent to said groove, has a tapered cam surface which cams said balls radially outward as said actuator moves to locking position and which permits radial inward movement of said balls as said actuator moves to unlocking position.

References Cited
UNITED STATES PATENTS

| | | | |
|---|---|---|---|
| 2,291,506 | 7/1942 | Shook et al. | 18—17U |
| 2,483,093 | 9/1949 | Harvey | 249—68 |
| 2,866,500 | 12/1958 | George et al. | 18—2TMUX |
| 2,978,741 | 4/1961 | Soderquist | 18—2TP |
| 3,075,237 | 1/1963 | Soderquist | 18—2TP |
| 3,214,791 | 11/1965 | Ericson et al. | 18—2TP |
| 3,241,180 | 3/1966 | Brundage | 18—2TP |

J. HOWARD FLINT, JR., Primary Examiner